United States Patent
Tangudu

(10) Patent No.: US 11,973,376 B2
(45) Date of Patent: Apr. 30, 2024

(54) ELECTRIC MOTOR WITH SIMPLIFIED WINDING AND U-SHAPED ROTOR

(71) Applicant: Hamilton Sundstrand Corporation, Charlotte, NC (US)

(72) Inventor: Jagadeesh Kumar Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 142 days.

(21) Appl. No.: 17/223,307

(22) Filed: Apr. 6, 2021

(65) Prior Publication Data
US 2022/0320928 A1  Oct. 6, 2022

(51) Int. Cl.
| | | |
|---|---|---|
| *H02K 1/28* | (2006.01) | |
| *H02K 1/20* | (2006.01) | |
| *H02K 1/2753* | (2022.01) | |
| *H02K 3/04* | (2006.01) | |
| *H02K 3/28* | (2006.01) | |

(52) U.S. Cl.
CPC ............. *H02K 1/28* (2013.01); *H02K 1/20* (2013.01); *H02K 1/2753* (2013.01); *H02K 3/04* (2013.01); *H02K 3/28* (2013.01)

(58) Field of Classification Search
CPC ...... H02K 1/141; H02K 1/143; H02K 1/2783; H02K 1/28; H02K 15/03; H02K 3/524; H02K 1/2798; H02K 16/02; H02K 16/025; H02K 3/24; H02K 3/28; H02K 1/2786–2792
USPC ........................ 310/154.23, 154.21, 156.39
See application file for complete search history.

(56) References Cited

U.S. PATENT DOCUMENTS

| | | | |
|---|---|---|---|
| 4,731,554 A | 3/1988 | Hall et al. | |
| 7,462,968 B2 | 12/2008 | Kusase et al. | |
| 10,505,412 B2 | 12/2019 | Klontz et al. | |
| 10,826,338 B2 | 11/2020 | Woolmer et al. | |
| 2009/0102305 A1* | 4/2009 | Lu ........................... | H02K 1/14 310/156.49 |
| 2012/0212085 A1* | 8/2012 | Fu .......................... | H02K 21/24 310/58 |

(Continued)

FOREIGN PATENT DOCUMENTS

| | | |
|---|---|---|
| CN | 106233579 A | 12/2016 |
| JP | 4728639 B2 | 7/2011 |

(Continued)

OTHER PUBLICATIONS

Search Report issued in European Patent Application No. 22166822.1; Application Filing Date Apr. 5, 2022; dated Oct. 17, 2022 (9 pages).

*Primary Examiner* — Daniel C Puentes
*Assistant Examiner* — Minki Chang
(74) *Attorney, Agent, or Firm* — CANTOR COLBURN LLP

(57) ABSTRACT

An electric motor is provided and includes a U-shaped rotor including circumferentially arranged U-shaped magnets, each circumferentially arranged U-shaped magnet defining an interior, and a stator supportive of a winding structure. The winding structure includes phase coils extending axially and radially within the interior for torque production with each circumferentially arranged U-shaped magnet and end windings respectively extending outside the interior between corresponding ends of sequential pairs of the phase coils.

20 Claims, 5 Drawing Sheets

(56) References Cited

U.S. PATENT DOCUMENTS

| | | | |
|---|---|---|---|
| 2012/0217834 A1* | 8/2012 | Lutz | H02K 1/2753 |
| | | | 29/598 |
| 2014/0183988 A1* | 7/2014 | Kulkarni | H02K 1/20 |
| | | | 310/54 |
| 2015/0137647 A1* | 5/2015 | Hunstable | H02K 1/30 |
| | | | 310/156.43 |
| 2016/0126792 A1* | 5/2016 | Yamaguchi | H02K 1/2766 |
| | | | 310/43 |
| 2016/0126794 A1* | 5/2016 | Gery | H02K 1/278 |
| | | | 310/156.01 |
| 2018/0219464 A1 | 8/2018 | Newmark et al. | |
| 2018/0331593 A1* | 11/2018 | Hunstable | H02K 31/02 |
| 2022/0069685 A1* | 3/2022 | Mao | H02K 16/02 |

FOREIGN PATENT DOCUMENTS

| | | | | |
|---|---|---|---|---|
| WO | 2019235953 A1 | 12/2019 | | |
| WO | WO-2019235953 A1 * | 12/2019 | | H02K 1/20 |

* cited by examiner

ELECTRIC MOTOR WITH SIMPLIFIED WINDING AND U-SHAPED ROTOR

BACKGROUND

The present disclosure relates to a motor drive and, in particular, to an electric motor with a simplified winding and a U-shaped rotor.

Typically, electrical machines have coils made with two torque producing sides and two non-torque producing sides. These are often referred to as end windings. Two torque producing sides are placed in the main length of the stator and have currents applied thereto in order to interact with magnetic fields produced by a rotor including torque producing permanent magnets. The end windings provide paths for the current to flow and to maintain continuity.

BRIEF DESCRIPTION

According to an aspect of the disclosure, an electric motor is provided and includes a U-shaped rotor including circumferentially arranged U-shaped magnets, each circumferentially arranged U-shaped magnet defining an interior, and a stator supportive of a winding structure. The winding structure includes phase coils extending axially and radially within the interior for torque production with each circumferentially arranged U-shaped magnet and end windings respectively extending outside the interior between corresponding ends of sequential pairs of the phase coils.

In accordance with additional or alternative embodiments, the winding structure generates a decoupled flux pattern when current is applied to the phase coils and the end windings.

In accordance with additional or alternative embodiments, each circumferentially arranged U-shaped magnet is continuous and unitary or has non-continuous and discrete sections.

In accordance with additional or alternative embodiments, each circumferentially arranged U-shaped magnet has a rounded U-shape or an angular U-shape.

In accordance with additional or alternative embodiments, the stator is formed to define axially extending cooling channels and the stator includes an axially extending member with a soft magnetic composite (SMC) tip disposed in the interior.

In accordance with additional or alternative embodiments, the phase coils are each provided with three phases, an odd number of phases greater than three or a multiple of three phases.

According to an aspect of the disclosure, an electric motor is provided and incudes a U-shaped rotor including circumferentially arranged U-shaped magnets, each circumferentially arranged U-shaped magnet comprising two axial sections and one radial section and defining an interior, and a stator supportive of a winding structure. The winding structure includes first phase coils extending axially within the interior for torque production with the two axial sections of each circumferentially arranged U-shaped magnet, second phase coils extending radially within the interior for torque production with the one radial section of each circumferentially arranged U-shaped magnet and end windings respectively extending outside the interior between corresponding exterior ends of sequential pairs of the first phase coils.

In accordance with additional or alternative embodiments, the winding structure generates a decoupled flux pattern when current is applied to the first and second phase coils and the end windings.

In accordance with additional or alternative embodiments, the two axial sections of the circumferentially arranged U-shaped magnets are arranged in a Halbach array.

In accordance with additional or alternative embodiments, the two axial sections and the radial section of each circumferentially arranged U-shaped magnet cooperatively form a continuous and unitary magnet or are non-continuous and discrete from one another.

In accordance with additional or alternative embodiments, the two axial sections and the radial section of each circumferentially arranged U-shaped magnet form a rounded U-shape or an angular U-shape.

In accordance with additional or alternative embodiments, the stator is formed to define axially extending cooling channels and the stator includes an axially extending member with a soft magnetic composite (SMC) tip disposed in the interior.

In accordance with additional or alternative embodiments, the first and second phase coils are each provided with three phases, an odd number of phases greater than three or a multiple of three phases.

According to an aspect of the disclosure, an electric motor is provided and includes a U-shaped rotor including circumferentially arranged U-shaped magnets, each circumferentially arranged U-shaped magnet including an inner axial section, an outer axial section and a radial section and defining an interior between the inner axial section, the outer axial section and the radial section, and a stator supportive of a winding structure. The winding structure includes first phase coils extending axially within the interior for torque production with the inner and outer axial sections of each circumferentially arranged U-shaped magnet, second phase coils respectively extending radially within the interior between corresponding interior ends of sequential pairs of the first phase coils for torque production with the radial section of each circumferentially arranged U-shaped magnet and end windings respectively extending outside the interior between corresponding exterior ends of sequential pairs of the first phase coils.

In accordance with additional or alternative embodiments, the winding structure generates a decoupled flux pattern between respective flux patterns of the inner and outer axial sections of each circumferentially arranged U-shaped magnet when current is applied to the first and second phase coils and the end windings.

In accordance with additional or alternative embodiments, the inner axial sections of the circumferentially arranged U-shaped magnets are arranged in a Halbach array and the outer axial sections of the circumferentially arranged U-shaped magnets are arranged in a Halbach array.

In accordance with additional or alternative embodiments, the inner axial section and the outer axial section of each circumferentially arranged U-shaped magnet are circumferentially shifted and the first phase coils are circumferentially shifted with respect to the second phase coils.

In accordance with additional or alternative embodiments, the inner axial section, the outer axial section and the radial section of each circumferentially arranged U-shaped magnet cooperatively form a continuous and unitary magnet or are non-continuous and discrete from one another and the inner axial section, the outer axial section and the radial section of each circumferentially arranged U-shaped magnet form a rounded U-shape or an angular U-shape.

In accordance with additional or alternative embodiments, the stator includes an axially extending member with a soft magnetic composite (SMC) tip disposed in the interior.

In accordance with additional or alternative embodiments, the first and second phase coils are each provided with three phases, an odd number of phases greater than three or a multiple of three phases.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, an electric motor is provided and has a simplified winding scheme with end windings disposed around back iron to reduce end winding length but still take advantage of distributed winding architecture. That is, the simplified winding scheme is characterized in that it exhibits a high fill factor and provides for higher torque than otherwise available. The electric motor can be provided with a U-shaped rotor configuration with two axial rotors (i.e., a Halbach array) and one semi-axial or radial rotor and takes advantage of torque producing coil sides (3-sides) for producing torque and to allow for effective utilization of the windings.

Figure 1A:
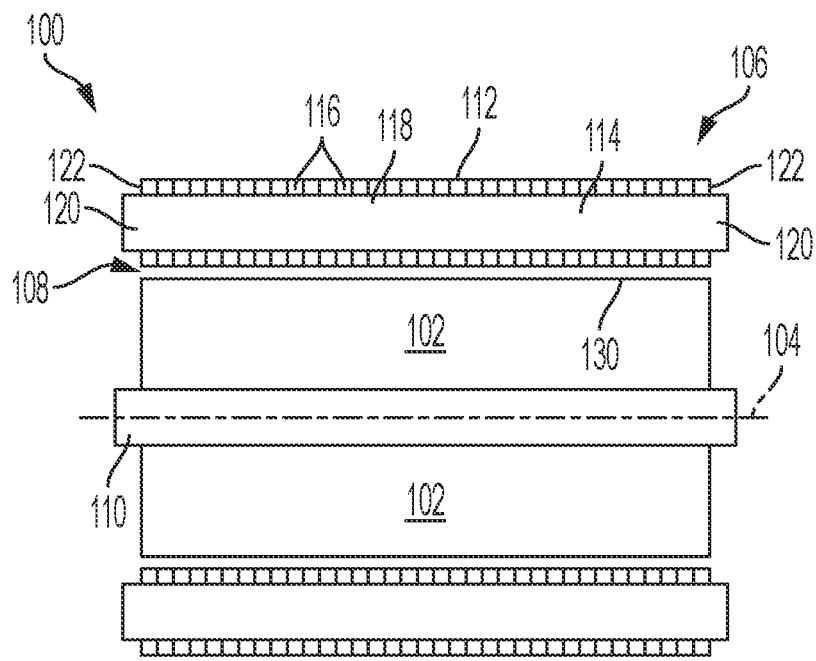
FIG. 1A is a partial view of an embodiment of electric motor.
Figure 1B:
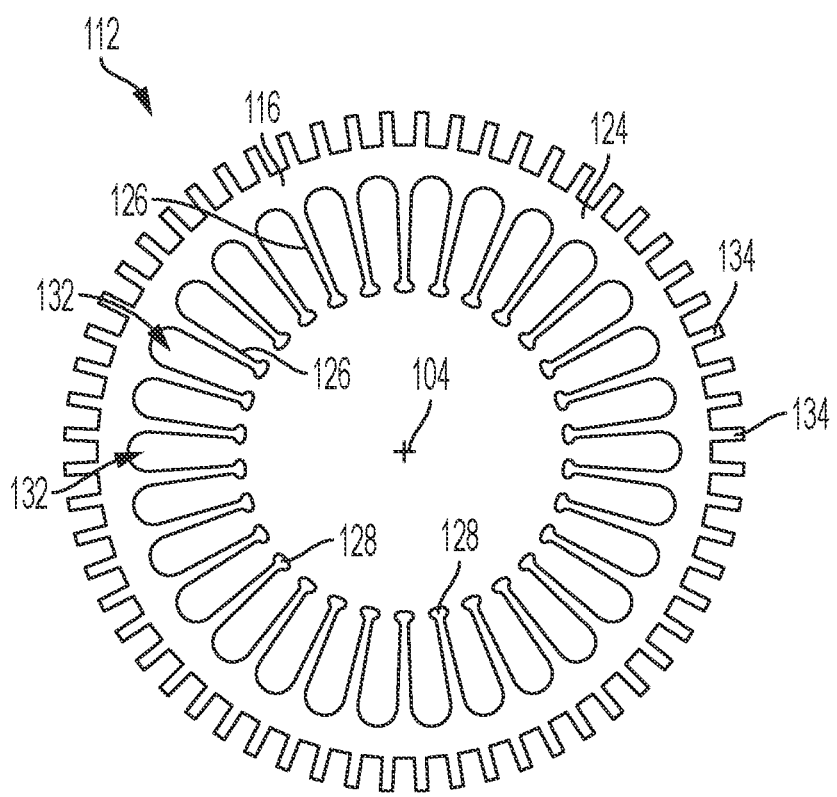
FIG. 1B is a cross-sectional view of an embodiment of a stator core of the electric motor of FIG. 1A.

With reference to FIGS. 1A and 1B, an electric motor 100 is provided and includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as the embodiment shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104.

Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A and 1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) often results in a TMS having a high weight to accommodate such loads. This can result in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2:
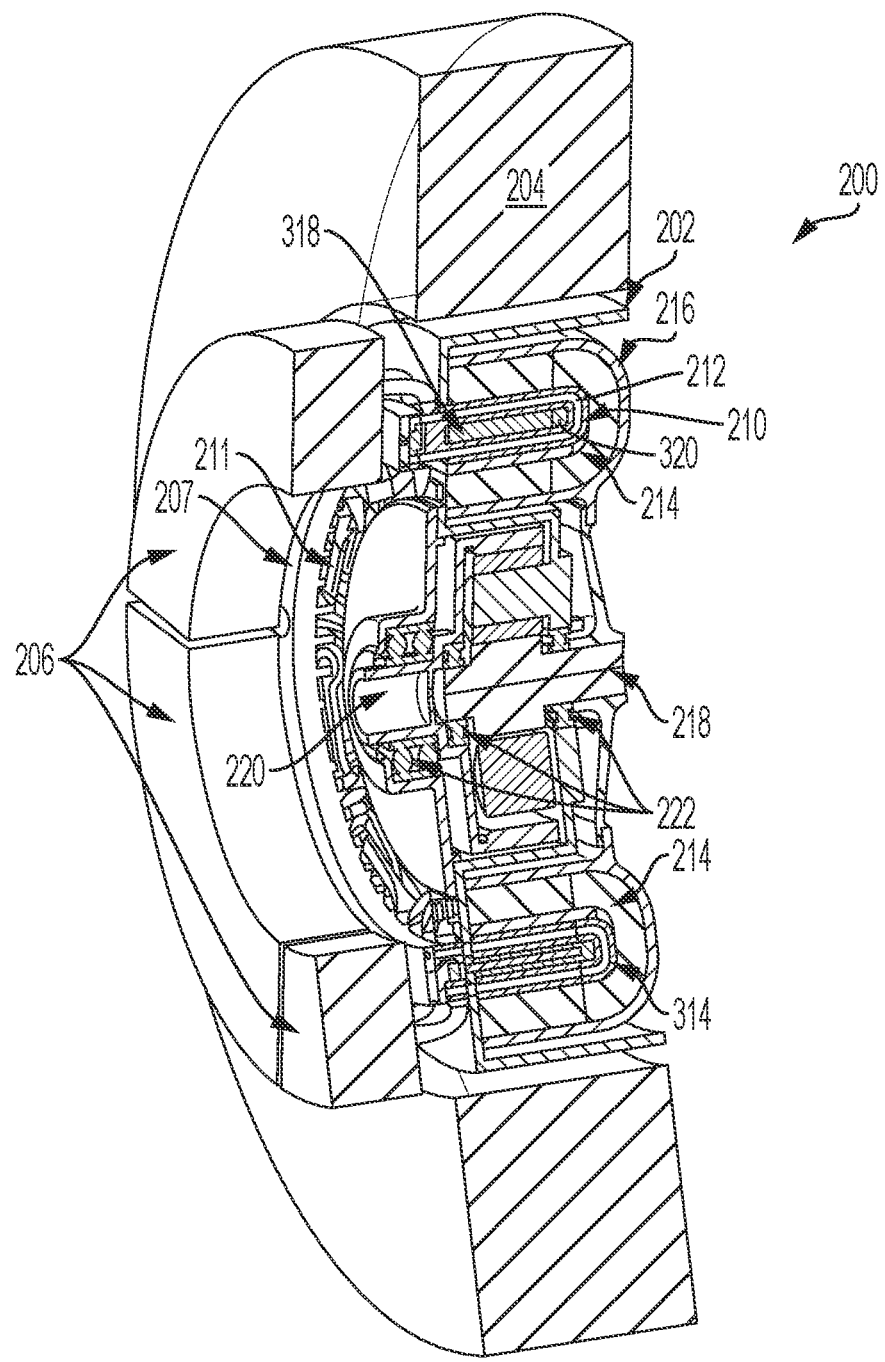
FIG. 2 is a cutaway perspective view of an aircraft electric motor in accordance with embodiments.

Turning now to FIG. 2, an aircraft electric motor 200 is provided and includes a motor housing 202, a condenser 204 and a power module system 206, which is separated from the motor housing 202 by plenum 207. The motor housing 202 houses a stator 210 and a rotor 212, with the rotor 212 configured to be rotatable about the stator 210. The rotor 212 includes a U-shaped magnet 214 that is arranged within a similarly shaped U-shaped rotor sleeve 216. The rotor sleeve 216 is operably connected to a hub 218, which is fixedly attached to a shaft 220. The shaft 220 is supported by bearings 222. The condenser 204 is configured to provide cooling to the components of the aircraft electric motor 200 and can include a heat exchanger and a header forming a closed-loop cooling system that provides air-cooling to a working fluid at the heat exchanger. As the aircraft electric motor 200 is operated, heat is generated and picked up by the working fluid within embedded cooling channels. The resulting heated working fluid is then passed through the header and back to the heat exchanger to be cooled, such as by air cooling. As shown, the condenser 204 may be a circular structure arranged about the motor housing 202. This configuration and arrangement allows for improved compactness of the system, which may be advantageous for aircraft applications. The rotor sleeve 216 with the magnets 214, the stator 210 and the gear assembly fit together (although moveable relative to each other) within the motor housing 202, providing for a compact (low volume/size) design.

The power module system 206 includes capacitors and other electronics, including, but not limited to, printed circuit boards (PCBs) that may enable control and operation of the aircraft electric motor 200. In general, the power module system 206 is electrically connected to the stator 210 to cause an electric current therein which will induce an electromagnetic field which will cause the rotor 212 to rotate. More particularly, the stator 210 includes windings 211 to which the power module 206 is attached and the power module 206 thus causes the electric current to be applied to the windings 211. The current in the windings 211 induces the electromagnetic field to drive the rotor 212 rotations.

With continued reference to FIG. 2, an integrated motor drive architecture can be provided and includes an electric motor, such as the aircraft electric motor 200 and the power module system 206 described above. In these or other cases, the power module system 206 can be integrated with and can be adjacent to the aircraft electric motor 200 with plenum 207 (see FIG. 2) axially interposed between the power module system 206 and the aircraft electric motor 200.

Figure 3A:
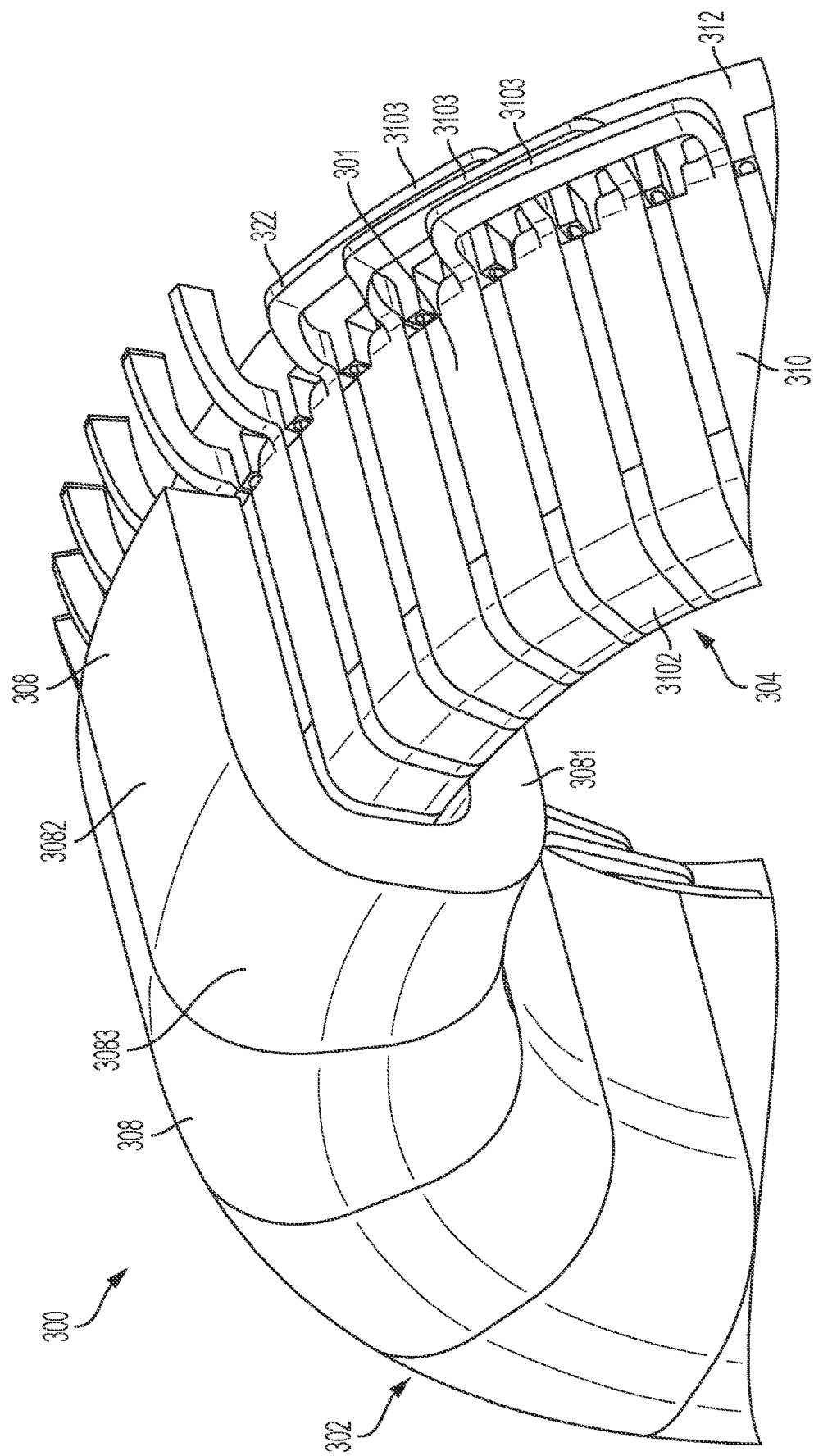
FIG. 3A is a perspective view of components of an electric motor in accordance with embodiments.
Figure 3B:
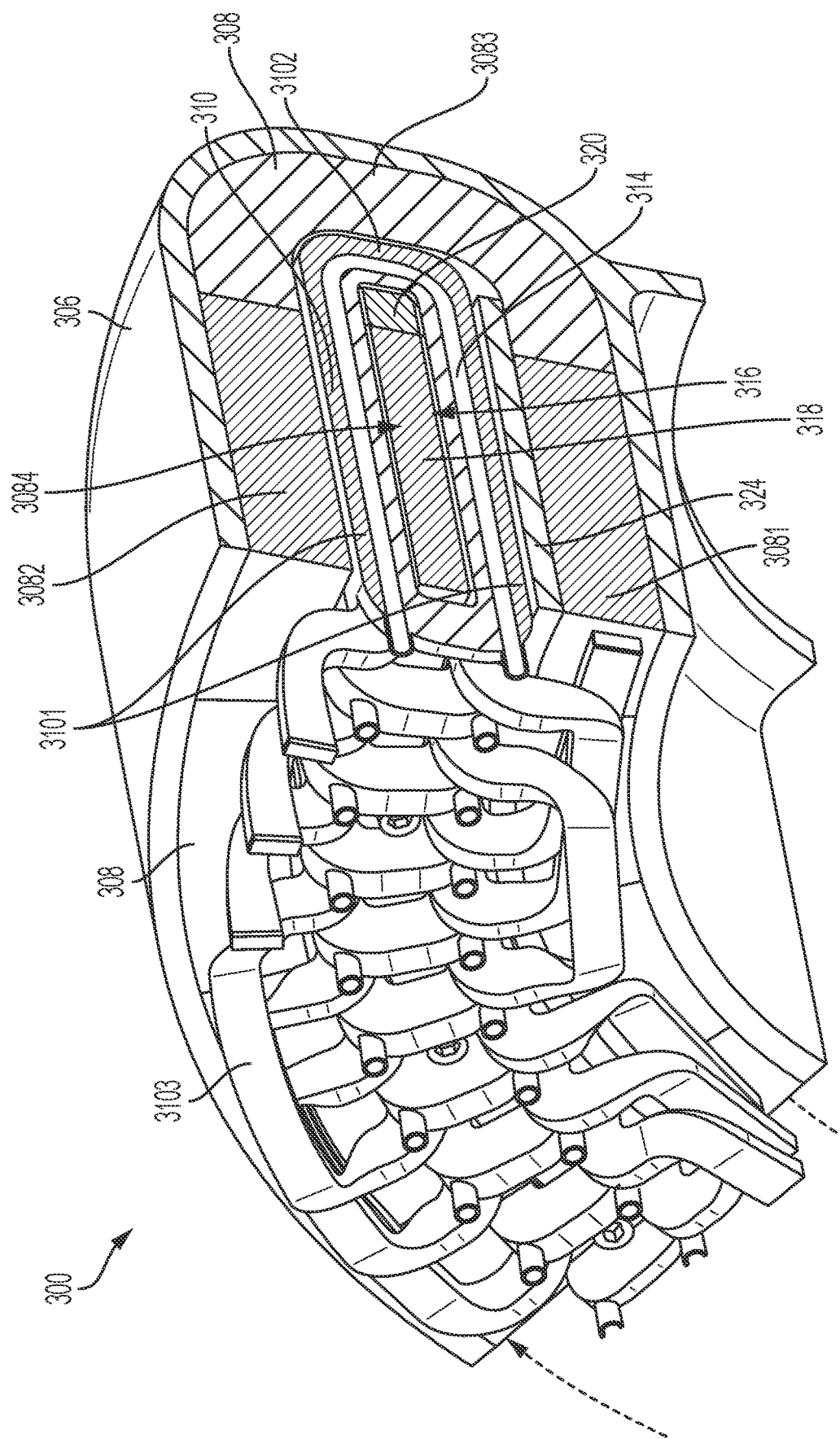
FIG. 3B is a perspective view of components of an electric motor in accordance with embodiments.

Referring now to FIGS. 3A and 3B, schematic illustrations of a portion of an aircraft electric motor 300 in accordance with embodiments is provided for use as the electric motor 200 of FIG. 2. As shown in FIGS. 3A and 3B, the portion of the aircraft electric motor 300 includes a rotor 302 and a stator 304. FIG. 3A illustrates the rotor 302 and the stator 304 and FIG. 3B illustrates these components arranged within a rotor sleeve 306.

The rotor 302 is formed of a plurality of circumferentially arranged U-shaped magnets 308. In some configurations, the circumferentially arranged U-shaped magnets 308 can be arranged with alternating polarity arranged in a circular structure. Arranged within the "U" of the circumferentially arranged U-shaped magnets 308 is the stator 304. The stator 304 is formed of or supportive of a winding structure 310. In this configuration, the winding structure 310 can include or be arranged with a header 312. The header 312 may be part of a cooling system and can be configured to cycle a working fluid through axially extending cooling channels 314 for cooling of portions of the winding structure 310.

As shown in FIG. 3B, the circumferentially arranged U-shaped magnets 308 are each U-shaped and arranged within the rotor sleeve 306. The rotor sleeve 306 is a substantially U-shaped sleeve that is sized and shaped to receive the circumferentially arranged U-shaped magnets 308. In this illustrative configuration, the rotor sleeve 306 can include an inner sleeve 324. The inner sleeve 324 may be configured to provide support to a portion of the circumferentially arranged U-shaped magnets 308. It will be appreciated that there is no direct contact between the winding structure 310 and the circumferentially arranged U-shaped magnets 308. This lack of contact enables free rotation of the rotor 302 relative to the stator 304 during operation Each circumferentially arranged U-shaped magnet 308 includes at least two axial sections and one radial section connection the axial sections. In accordance with embodiments, as shown in FIGS. 3A and 3B, each circumferentially arranged U-shaped magnet 308 includes an inner axial section 3081, an outer axial section 3082 and a radial section 3083 and defines an interior 3084 (see FIG. 3B) between the inner axial section 3081, the outer axial section 3082 and the radial section 3083.

The winding structure 310 can be electrically connected to one or more power module systems and includes first phase coils 3101, second phase coils 3102 and end windings 3103. The first phase coils 3101 extend axially within the interior 3084 for torque production with the inner and outer axial sections 3081 and 3082 of each circumferentially arranged U-shaped magnet 308. The second phase coils 3102 respectively extend radially within the interior 3084 between corresponding interior ends of sequential pairs of the first phase coils 3101 for torque production with the radial section 3083 of each circumferentially arranged U-shaped magnet 308. The end windings 3103 respectively extend outside the interior 3084 between corresponding exterior ends 322 of sequential pairs of the first phase coils 3101.

In accordance with embodiments, the first and second phase coils 3101 and 3102 can each be provided with three phases, an odd number of phases greater than three or a multiple of three phases.

In accordance with embodiments, the winding structure 310 generates a decoupled flux pattern between respective flux patterns of the inner and outer axial sections 3081 and 3082 of each circumferentially arranged U-shaped magnet 308 when current is applied to the first and second phase coils 3101 and 3102 and the end windings 3103. Also, the inner axial sections 3081 of the circumferentially arranged U-shaped magnets 308 can be arranged in a Halbach array formation and the outer axial sections 3082 of the circumferentially arranged U-shaped magnets 308 can be arranged in a Halbach array formation.

At least the first and second phase coils 3101 and 3102 of the winding structure 310 can be wrapped about a support structure 316. The support structure 316 may include a laminate axially extending member 318 and a soft magnetic composite (SMC) tip 320. The laminate axially extending member 318 may be formed from cobalt steel laminate. In accordance with embodiments, the laminate axially extending member 318 can be formed of laminates, SMC or some combinations thereof. Similarly, in accordance with additional or alternative embodiments, the SMC tip 320 can be formed of SMC, laminates or some combinations thereof. In any case, it is to be understood that the presence of the SMC tip 320 serves to generate torque at or proximate to the location at which the U-shaped magnets 308 turn.

Figure 4:
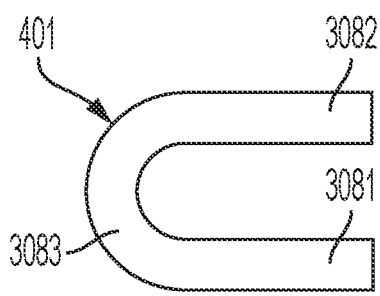
FIG. 4 is a schematic side view of a continuous and unitary U-shaped magnet in accordance with embodiments.
Figure 5:
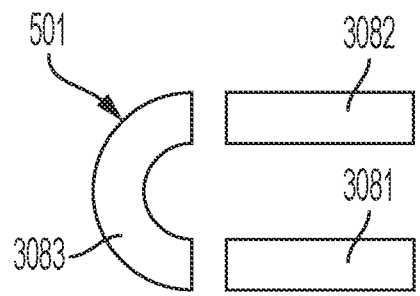
FIG. 5 is a schematic side view of a non-continuous U-shaped magnet with discrete sections in accordance with embodiments.
Figure 6:
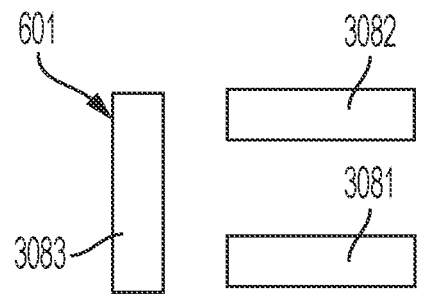
FIG. 6 is a schematic side view of an angular U-shaped magnet in accordance with embodiments FIG. 7 are schematic illustrations of rotor configurations in accordance with embodiments.

With reference to FIGS. 4-6 and in accordance with embodiments, particular configurations of each circumferentially arranged U-shaped magnet 308 will now be described. As shown in FIG. 4 (and in FIGS. 3A and 3B), the inner axial section 3081, the outer axial section 3082 and the radial section 3083 of each circumferentially arranged U-shaped magnet 308 cooperatively form a continuous and unitary magnet 401. Alternatively, as shown in FIG. 5, the inner axial section 3081, the outer axial section 3082 and the radial section 3083 of each circumferentially arranged U-shaped magnet 308 are non-continuous and discrete from one another in an arrangement 501. In other alternative embodiments, the inner axial section 3081, the outer axial section 3082 and the radial section 3083 of each circumferentially arranged U-shaped magnet 308 form an angular U-shape 601 (as opposed to the rounded U-shapes of FIGS. 4 and 5). In any case, as indicated by the dashed arc-arrows of FIG. 3B, the inner axial section 3081 and the outer axial section 3082 can be circumferentially shifted with respect to one another. Similarly, as is also indicated by the dashed arc-arrows of FIG. 3B, the first and second phase coils 3101 and 3102 can be circumferentially shifted with respect to one another.

Figure 7:
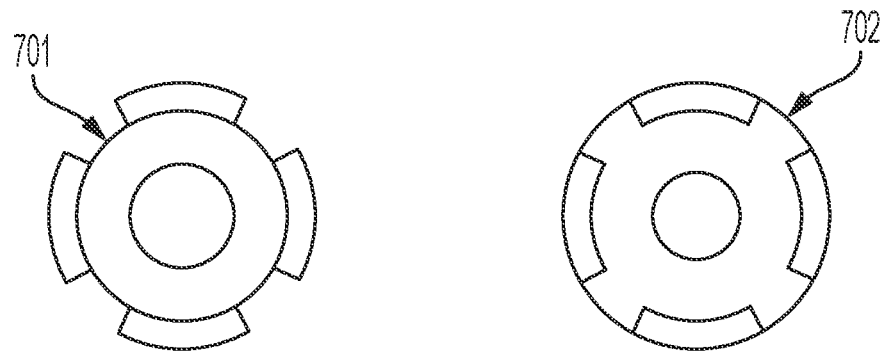
Figure 7:
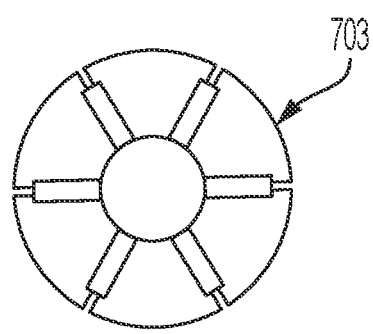

With reference to FIG. 7 and in accordance with embodiments, the circumferentially arranged U-shaped magnets 308 of FIGS. 3A, 3B, 4, 5 and 6 can each have at least one or more of a surface permanent magnet (SPM) formation 701, an internal permanent magnet (IPM) formation 702 and a spoke formation 703 as well as other variants. In accordance with embodiments, the formation of the inner axial section 3081 and the outer axial section 3082 can be the same or different from one another.

Technical effects and benefits of the present disclosure are the provision an electric motor with a dual rotor configuration (i.e., a Halbach array) which can take advantage of torque producing coils for producing torque and to allow for effective utilization of the windings. This allows the electric motor to operate at increased torque density with reduced end winding size, weight and losses and with a simplified construction and an improved production rate.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An electric motor, comprising:
   a U-shaped rotor comprising circumferentially arranged U-shaped magnets, each circumferentially arranged U-shaped magnet having a rounded U-shape with flat axial sections, a radial section and rounded corners respectively interposed between the radial section and each of the flat axial sections and defining an interior; and
   a stator supportive of a winding structure comprising:
   phase coils extending axially and radially within the interior for torque production with each circumferentially arranged U-shaped magnet;
   end windings respectively extending outside the interior between corresponding ends of sequential pairs of the phase coils; and
   an axially extending member comprising a cobalt steel member and a soft magnetic core (SMC) tip which forms a support structure,
   wherein the phase coils are wrapped about an external surface of the SMC tip.

2. The electric motor according to claim 1, wherein the winding structure generates a decoupled flux pattern when current is applied to the phase coils and the end windings.

3. The electric motor according to claim 1, wherein:
   each circumferentially arranged U-shaped magnet is continuous and unitary, and
   there is no direct contact between the winding structure and each circumferentially arranged U-shaped magnets.

4. The electric motor according to claim 1, wherein the stator is formed to define axially extending cooling channels.

5. The electric motor according to claim 1, wherein the phase coils are each provided with three phases, an odd number of phases greater than three or a multiple of three phases.

6. The electric motor according to claim 1, wherein the radial section and the rounded corners form a single smooth curve between each of the flat axial sections, each of which comprises a distal end that extends in a straight line.

7. An electric motor, comprising:
   a U-shaped rotor comprising:
   circumferentially arranged U-shaped magnets, each circumferentially arranged U-shaped magnet comprising two axial sections and one radial section and having a rounded U-shape with the two axial sections being flat and rounded corners respectively interposed between the radial section and each of the two axial sections and defining an interior;
   a U-shaped rotor sleeve sized and shaped like an external surface of each circumferentially arranged U-shaped magnet and in which each circumferentially arranged U-shaped magnet is arranged; and
   an inner sleeve to provide support to a portion of an internal surface of each circumferentially arranged U-shaped magnet; and
   a stator supportive of a winding structure comprising:
   first phase coils extending axially within the interior for torque production with the two axial sections of each circumferentially arranged U-shaped magnet;
   second phase coils extending radially within the interior for torque production with the one radial section of each circumferentially arranged U-shaped magnet;
   end windings respectively extending outside the interior between corresponding exterior ends of sequential pairs of the first phase coils; and
   an axially extending member, which extends axially along a length of the inner sleeve and which comprises a cobalt steel laminate with a soft magnetic composite (SMC) tip, the axially extending member being disposed in the interior of each circumferentially arranged U-shaped magnet and forming a support structure,
   wherein the first and second phase coils are wrapped about an external surface of the SMC tip.

8. The electric motor according to claim 7, wherein the winding structure generates a decoupled flux pattern when current is applied to the first and second phase coils and the end windings.

9. The electric motor according to claim 7, wherein the two axial sections of the circumferentially arranged U-shaped magnets are arranged in a Halbach array.

10. The electric motor according to claim 7, wherein:
the two axial sections and the radial section of each circumferentially arranged U-shaped magnet cooperatively form a continuous and unitary magnet, and
there is no direct contact between the winding structure and each circumferentially arranged U-shaped magnets.

11. The electric motor according to claim 7, wherein the stator is formed to define axially extending cooling channels.

12. The electric motor according to claim 7, wherein the first and second phase coils are each provided with three phases, an odd number of phases greater than three or a multiple of three phases.

13. The electric motor according to claim 7, wherein the radial section and the rounded corners form a single smooth curve between each of the two axial sections, each of which comprises a distal end that extends in a straight line.

14. An electric motor, comprising:
a U-shaped rotor comprising:
circumferentially arranged U-shaped magnets, each circumferentially arranged U-shaped magnet comprising an inner axial section, an outer axial section and a radial section that cooperatively form a rounded U-shape with the two axial sections being flat and rounded corners respectively interposed between the radial section and each of the two axial sections and defining an interior between the inner axial section, the outer axial section and the radial section;
a U-shaped rotor sleeve sized and shaped like an external surface of each circumferentially arranged U-shaped magnet and in which each circumferentially arranged U-shaped magnet is arranged; and
an inner sleeve to provide support to a portion of an internal surface of each circumferentially arranged U-shaped magnet; and
a stator supportive of a winding structure comprising:
first phase coils extending axially within the interior for torque production with the inner and outer axial sections of each circumferentially arranged U-shaped magnet;
second phase coils respectively extending radially within the interior between corresponding interior ends of sequential pairs of the first phase coils for torque production with the radial section of each circumferentially arranged U-shaped magnet;
end windings respectively extending outside the interior between corresponding exterior ends of sequential pairs of the first phase coils; and
an axially extending member, which extends axially along a length of the inner sleeve and which comprises a cobalt steel laminate with a soft magnetic composite (SMC) tip, the axially extending member being disposed in the interior of each circumferentially arranged U-shaped magnet and forming a support structure,
wherein the first and second phase coils are wrapped about an external surface of the SMC tip.

15. The electric motor according to claim 14, wherein:
the winding structure generates a decoupled flux pattern between respective flux patterns of the inner and outer axial sections of each circumferentially arranged U-shaped magnet when current is applied to the first and second phase coils and the end windings, and
there is no direct contact between the winding structure and each circumferentially arranged U-shaped magnets.

16. The electric motor according to claim 14, wherein:
the inner axial sections of the circumferentially arranged U-shaped magnets are arranged in a Halbach array, and
the outer axial sections of the circumferentially arranged U-shaped magnets are arranged in a Halbach array.

17. The electric motor according to claim 14, wherein the inner axial section, the outer axial section and the radial section of each circumferentially arranged U-shaped magnet cooperatively form a continuous and unitary magnet.

18. The electric motor according to claim 14, wherein the stator is formed to define axially extending cooling channels.

19. The electric motor according to claim 14, wherein the first and second phase coils are each provided with three phases, an odd number of phases greater than three or a multiple of three phases.

20. The electric motor according to claim 14, wherein the radial section and the rounded corners form a single smooth curve between each of the two axial sections, each of which comprises a distal end that extends in a straight line.

* * * * *